United States Patent [19]

Graiver et al.

[11] Patent Number: 5,118,758
[45] Date of Patent: Jun. 2, 1992

[54] COPRECIPITATED SILICATE-CARBINOL PARTICLES

[75] Inventors: Daniel Graiver, Midland; Nedeljko V. Gvozdić, Bay City, both of Mich.

[73] Assignee: Dow Corning Corporation, Midland, Mich.

[21] Appl. No.: 698,040

[22] Filed: May 10, 1991

[51] Int. Cl.⁵ .............................................. C08L 29/04
[52] U.S. Cl. ....................................... 525/58; 525/61
[58] Field of Search ........................... 525/58, 61, 100

[56] References Cited

U.S. PATENT DOCUMENTS

| | | | |
|---|---|---|---|
| 4,214,057 | 7/1980 | Ishihara et al. | 525/100 |
| 4,423,095 | 12/1983 | Blizzard | 427/387 |
| 4,617,239 | 6/1986 | Maruyama et al. | 428/452 |
| 4,954,554 | 9/1990 | Bunye | 524/388 |

FOREIGN PATENT DOCUMENTS

| | | | |
|---|---|---|---|
| 1186099 | 4/1985 | Canada . | |
| 2449085 | 4/1976 | Fed. Rep. of Germany | 525/58 |
| 38347 | 10/1978 | Japan . | |
| 54-050551 | 4/1979 | Japan | 525/58 |
| 99987 | 7/1980 | Japan . | |
| 804644 | 2/1981 | U.S.S.R. . | |

*Primary Examiner*—John C. Bleutge
*Assistant Examiner*—Ralph H. Dean, Jr.
*Attorney, Agent, or Firm*—Edward C. Elliott

[57] ABSTRACT

A fine powder is obtained by first dissolving polyvinylalcohol and tetraalkoxysilicate in a common solvent to obtain a reaction product, then spraying a fine mist of a solution of the reaction product into a coagulating bath of a solvent which is miscible with the common solvent, but a poor solvent for the reaction product. After drying, the fine particles obtained are useful as filler in polydiorganosiloxane compositions.

5 Claims, No Drawings

COPRECIPITATED SILICATE-CARBINOL PARTICLES

BACKGROUND OF THE INVENTION

1. Field of the Invention

This invention relates to reaction of a silicate and polycarbinol, then recovering the product as small particles useful as reinforcement in polydiorganosiloxane.

2. Background Information

Improved mechanical properties of blends made from polyvinylalcohol (PVA) and polydiorganosiloxane are reported in Japanese applications No. 38347/78, 99987/80, and 73059/82. Improved properties are obtained when silica filler is included as a reinforcing filler.

Chemical modification of PVA with a silylating agent is known as in U.S. Pat. No. 4,617,239, issued Oct. 14, 1986. This patent discloses a silicone containing PVA agents useful in paper coatings. One method introduces a silicone moiety into a PVA by post modification with a silylating agent or addition into a derivative of PVA that contains carboxylic groups such as partially saponified polyvinyl acetate followed by saponification of the residual acetates. Another method saponifies a copolymer of vinyl ester and silicone-containing olefinic unsaturated monomer followed by addition polymerization.

SUMMARY OF THE INVENTION

Fine particles of a silicate-polyvinylalcohol reaction product are produced by mixing together in a common solvent, then spraying as a fine mist into a second solvent which is miscible with the common solvent, but a poor solvent for the reaction product.

DESCRIPTION OF THE INVENTION

This invention relates to a process for the preparation of fine particles of a silicate-polyvinylalcohol reaction product comprising (A) dissolving a silicate of the formula $Si(OR')_4$ or its hydrolyzed oligomer where R' is an alkyl radical of 1 to 4 carbon atoms and a polyvinylalcohol in a common solvent to form a reaction product, then (B) spraying the solution as a fine mist into a container of second solvent, the second solvent being miscible with the first solvent and being a poor solvent for the reaction product, then (C) recovering the resultant fine particles of reaction product from the mixed solvent. The fine particles produced by this process are very useful as reinforcing filler in polydiorganosiloxane polymers used to produce elastomers.

The use of polydiorganosiloxane in producing elastomers is well known. Lower molecular weight polymers are used to make sealant formulations, which are crosslinked through the use of moisture sensitive curing systems. Higher molecular weight polymers in the form of gums are used to make heat curable elastomeric formulations which are crosslinked with organic peroxides. In both cases, the physical properties of the cured elastomers are improved enough to make useful elastomers by the addition to the formulations of fillers. The most efficient fillers are the various forms of colloidal silica, such as fumed silica, but these reinforcing fillers increase the viscosity of the mix to a great degree. Other fillers, such as ground quartz and calcium carbonate, are referred to as non-reinforcing fillers. These are used primarily to extend the very expensive polydiorganosiloxane, but do give a degree of improvement to the physical properties. The fine particles of this invention are also useful as filler in polydiorganosiloxane.

The method of this invention combines polyvinylalcohol (PVA) with a silicate by dissolving a silicate with a fully hydrolyzed PVA in a common solvent. The PVA can be any of the commercially available grades which are available. The grades vary in molecular weight from as low as about 10,000 to as high as about 115,000. The PVA is preferably fully hydrolyzed with less than 2 percent residual carboxylate moieties left in the polymer. It is further preferred to use PVA which has less than 1 percent residual carboxylate groups if high mechanical strength is desired. The amount of branching, 1,2 glycol linkages, and the stereoregularity of the PVA does not seem to affect the usefulness of the reaction product as much as does the molecular weight and the degree of hydrolysis. The PVA used in this invention is in the dry form. It is not dissolved in water as is the PVA used in most applications.

The silicate used is of the formula $Si(OR')_4$ or its partially condensed versions. R' is an alkyl radical of 1 to 4 carbon atoms, with ethyl being the preferred radical. The preferred silicate is tetraethyl silicate, $Si(OCH_2CH_3)_4$, also known as ethylorthosilicate. Silicates, particularly the tetraethylsilicate, are well known and readily available chemicals.

The process of this invention first dissolves the dry PVA and the silicate in a common solvent. Common solvents include dimethylsulfoxide (DMSO), dimethylforamide (DMF), and ethylene glycol. The preferred solvent is DMSO. Water is a common solvent for both PVA and silicate, but is not suitable for use in this process because it also reacts with the ingredients so that the proper reaction product is not obtained. Solution concentrations up to about 20 percent by weight can be obtained by simply heating the mixture of PVA and solvent at about 100° C. It is preferred to solubilize the PVA in the solvent under an inert atmosphere such as nitrogen to minimize the degradation of the PVA during heating. The viscosity of the solution will depend upon the concentration of PVA, the molecular weight of the PVA, and the degree of hydrolysis. Highest viscosity is obtained when high concentration, high molecular weight, and high degree of hydrolysis polymer is used. When the ingredients are mixed in the common solvent, it is thought that there is a reaction between the hydroxyl groups on the PVA and the alkoxy groups on the silicate; giving a reaction product.

This solution is then sprayed as a fine mist into a container of second solvent. The size of the fine particles recovered from the process is dependent upon the nature of the fine mist produced in this step, as well as the concentration of the reaction product produced in the first step. The finer the particle size of the mist, the smaller the final particles. The size of the particles produced depends upon the spray equipment used, the temperature of the solution, pressure, and nozzle size and type. It is preferred that the mist produced in this step be such that the final particles have an average diameter of less than 10 micrometers, as this is about the maximum size that can be used as a filler without adversely effecting the properties and appearance of reinforced elastomers.

The second solvent is one which is miscible with the common solvent, but is a poor solvent for the reaction product of the silicate and PVA. Solvents which are acceptable are acetone and tetrahydrofurane, with acetone being the preferred solvent.

When the solution of common solvent and reaction product is sprayed as fine particles into the second solvent, the fine particles are dispersed throughout the second solvent and the reaction product then precipitates in the mixture in the form of fine particles. The size of the fine particles which result depends upon the size of the particles which result from the spray operation and the solids content of the solution as it is sprayed. The lower the solids content of the solution, the smaller the size of the resultant fine particles for any given size of the particles being sprayed. The practical lower concentration of the solution sprayed is about 1 percent. These resultant fine particles are recovered by removal of the solvent mixture. The simplest manner is by filtering the particles from the solvent mixture, followed by evaporation of the remaining solvent mixture from the particles by heating, vacuum, or both. Preferably the resultant fine particles have an average particle size of 10 micrometers or less, most preferably 1 micrometer or less, since the smaller the particle, the greater the reinforcement obtained by adding the resultant fine particles.

The resultant fine particles have been found to function very well as a reinforcing filler in polydiorganosiloxane based elastomers. These polydiorganosiloxane based elastomers are well known in the industry. They include both the high molecular weight polymers which are compounded with filler and crosslinked with organic peroxide and heat, as well as the lower molecular weight polymers which are compounded with filler and crosslinkers and are catalyzed with room temperature curing catalysts. A large variety of such systems are known which cure upon exposure to moisture, such as the moisture found in the air. A cure system based upon crosslinking with a silicon compound containing hydrogen bonded to silicon and a polydiorganosiloxane containing alkenyl groups, using platinum as a catalyst, is also well known. When the resultant fine particles produced by the process of this invention are used as filler in compositions such as above described, and the compositions are then cured to give a silicone elastomer, the cured polymer has been found to have bonded in a cohesive manner to the surface of the resultant fine powder used as a filler in the composition.

Polydiorganosiloxane elastomers are preferably prepared from polymer of the formula $HO(SiR_2O)_xH$ where R is a monovalent hydrocarbon radical such as methyl, vinyl, phenyl, and 3,3,3-trifluoropropyl and x is such that the polymer has a viscosity varying from about 10 Pa·s to 1,000 Pa·s and higher so that the polymer is a slowly-flowing gum. Elastomers are formed by adding filler for reinforcement and extension and a curing system such as organic peroxide for the heat curing compositions. A typical moisture curing system is obtained by adding a crosslinking agent such as methyltriacetoxysilane and a tin catalyst such as dibutyltindiacetate. The composition is stable in the absence of moisture, but crosslinks into an elastomer upon exposure to moisture. Many different types of curing systems for polydiorganosiloxane elastomers are shown in the literature.

The fine particles of this invention are thought to perform best as reinforcement for polydiorganosiloxane when the R' of the silicate is the same or similar to the R of the polydiorganosiloxane. When 15 parts of fine particles were made using ethyl as R' and added to 100 parts of polydiorganosiloxane which was polydimethylsiloxane, the cured elastomer showed excellent adhesion between the particles and the polymer when cured samples were fractured and the fractured surface was examined under high magnification.

The following examples are included for illustrative purposes only and should not be construed as limiting the invention which is properly set forth in the appended claims.

EXAMPLE 1

A resultant fine powder was prepared by first dissolving 20 g of poly(vinyl alcohol) having a molecular weight of 86,000 and degree of saponification greater than 99.8 mol percent in 180 g of dimethylsulfoxide at a temperature of 110° C. Next the solution was allowed to cool to about 60° C. and 8 g of tetraethylsilicate was added under continuous stirring. Stirring at 60° C. was continued for an additional hour. Portions of this solution were then further diluted with additional dimethylsulfoxide to about 2 weight percent solids content and sprayed as a fine mist through a chromatography sprayer. The fine mist was allowed to fall into a coagulation container partially filled with acetone held at room temperature. Fine precipitates were formed in the acetone as the dimethylsulfoxide solution came in contact with the acetone coagulating bath. The fine precipitated particles were then washed with additional acetone and then dried by allowing the acetone to evaporate in a hood at room temperature. The particles which were obtained were mostly spherical in shape and had a wide particle size distribution. Most of the particles had a diameter of 4 to 10 micrometers.

A reinforced silicone moisture-curing elastomeric composition was prepared by mixing 5 g of the above fine particles of reaction product with 26 g of a hydroxyl endblocked polydimethylsiloxane with an approximate number average molecular weight of about 60,000 and 5 g of a mixture of 50 percent by weight methyltriacetoxysilane and 50 percent by weight ethyltriacetoxysilane in a sealed tube for 5 minutes. Then 0.05 g of dibutyltindiacetate was added and mixed for 1 minute. The mixture was then extruded onto a release plate and formed into 2 sheets about 2 mm thick. The sheets were allowed to cure for 7 days at 50 percent relative humidity and 25° C. to give a cured silicone elastomer reinforced with 15 weight percent of fine particles of the reaction product of EOS and PVA. These test sheets were then cut into test samples and evaluated in accordance with ASTM D 412 for tensile strength and elongation at break. The properties are shown below in Table 1.

EXAMPLE 2

Samples prepared as in Example 1 were heat aged in an air circulating oven for 7 hours at 150° C. and at 170° C., then evaluated as above. After heat aging at 150° C., the sample turned from white to light tan. After heat aging at 170° C., the sample turned to light brown. The physical properties after heat aging are shown in Table 1.

CONTROL

Control sample 1 was prepared by repeating the process of Example 1, but without the fine particles of the reaction product as filler.

Control sample 2 in Table 1 is the listed property for the PVA used in the Examples taken from the product literature.

TABLE I

| Example | Tensile Strength psi | Elongation percent |
|---|---|---|
| 1 | 470 | 430 |
| 1 after 7 hours aging at 150° C. | 425 | 450 |
| 2 | 430 | 1850 |
| 2 after 7 hours aging at 170° C. | 390 | 1500 |
| Control 1 | 80 | 340 |
| Control 2 | 22,000 | |

That which is claimed is:

1. A process for the preparation of fine particles of a silicate-polyvinylalcohol reaction product comprises (A) dissolving a silicate of the formula $Si(OR')_4$ or its hydrolyzed oligomer where $R'$ is an alkyl radical of 1 to 4 carbon atoms and a polyvinylalcohol in a common solvent to form a reaction product, then (B) spraying the solution as a fine mist into a container of second solvent, the second solvent being miscible with the first solvent and being a poor solvent for the reaction product, then (C) recovering the resultant fine particles of reaction product from the mixed solvent.

2. The process of claim 1 in which the silicate of (A) is tetraethylsilicate.

3. The process of claim 2 in which the common solvent is dimethylsulfoxide.

4. The process of claim 3 in which the second solvent is acetone.

5. A curable, reinforced polydiorganosiloxane comprising a uniform mixture of curable polydiorganosiloxane and the resultant fine particles of claim 1.

* * * * *